(12) United States Patent
Chen et al.

(10) Patent No.: US 11,620,015 B2
(45) Date of Patent: Apr. 4, 2023

(54) ELECTRONIC DEVICE

(71) Applicant: ASUSTeK COMPUTER INC., Taipei (TW)

(72) Inventors: Ya-Ting Chen, Taipei (TW); Chien-Chih Tseng, Taipei (TW); Yao-Yu Tsai, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/573,747

(22) Filed: Jan. 12, 2022

(65) Prior Publication Data

US 2022/0236826 A1 Jul. 28, 2022

(30) Foreign Application Priority Data

Jan. 27, 2021 (TW) ................. 11010312.0

(51) Int. Cl.
*G06F 3/041* (2006.01)
*G06F 3/04886* (2022.01)

(52) U.S. Cl.
CPC ........ *G06F 3/0416* (2013.01); *G06F 3/04886* (2013.01)

(58) Field of Classification Search
CPC .. G06F 3/016; G06F 3/03545; G06F 3/03547; G06F 3/0393; G06F 3/0412; G06F 3/0488; G06F 3/04886; G06F 1/1616; G06F 1/1643; G06F 2203/04808
See application file for complete search history.

(56) References Cited

U.S. PATENT DOCUMENTS

| | | | |
|---|---|---|---|
| 10,761,569 B2 | 9/2020 | Klein et al. | |
| 2013/0113724 A1* | 5/2013 | Chung | G06F 3/04886 345/173 |
| 2016/0124602 A1* | 5/2016 | Chien | G06F 3/0304 345/173 |
| 2016/0349989 A1* | 12/2016 | Yu | G06F 3/041 |
| 2017/0344215 A1* | 11/2017 | Zhang | G06F 1/169 |
| 2019/0250666 A1* | 8/2019 | Klein | G06F 3/0393 |

FOREIGN PATENT DOCUMENTS

| | | |
|---|---|---|
| CN | 104345930 A | 2/2015 |
| CN | 105718096 A | 6/2016 |
| CN | 110471543 A | 11/2019 |
| CN | 111727418 A | 9/2020 |

* cited by examiner

*Primary Examiner* — Ryan A Lubit
(74) *Attorney, Agent, or Firm* — McClure, Qualey & Rodack, LLP (57) ABSTRACT

The disclosure provides an electronic device, including a display panel, a touch component, and a processor. The display panel includes a display region, the touch component includes a touch region, and the processor is electrically connected to the display panel and the touch component. The processor defines an effective input region for executing a function of at least one input component in the touch region, to establish link setting information between the input component and the corresponding effective input region, and execute the function of the input component according to the link setting information in response to a touch operation sensed by the effective input region.

10 Claims, 6 Drawing Sheets

ELECTRONIC DEVICE

CROSS-REFERENCE TO RELATED APPLICATION

This application claims the priority benefit of Taiwan application serial No. 110103120, filed on Jan. 27, 2021. The entirety of the above-mentioned patent application is hereby incorporated by reference herein and made a part of the specification.

BACKGROUND OF THE INVENTION

Field of the Invention

The disclosure relates to an electronic device including a customized touch operation interface.

Description of the Related Art

As use of notebook computers becomes increasingly popular, and the notebook computers tend to be lightweight, fixed and limit operating space of conventional touchpads gradually cannot meet requirements of users, and large-size touchpads become a new trend. For a large-size touchpad, to meet a multi-user scenario, more input modes are combined with the large-size touchpad, to provide more diversified input modes.

BRIEF SUMMARY OF THE INVENTION

According to an aspect of the disclosure, an electronic device is provided. The electronic device includes a display panel, a touch component, and a processor. The display panel includes a display region, the touch component includes a touch region, and the processor is electrically connected to the display panel and the touch component. The processor defines an effective input region for executing a function of at least one input component in the touch region, to establish link setting information between the input component and the corresponding effective input region, and execute the function of the input component according to the link setting information in response to a touch operation sensed by the effective input region.

In conclusion, in the disclosure, according to requirements of users, an operation position of the input component corresponding to the touch component is set dynamically, to provide user-defined multi-mode touch operation interfaces, thereby further providing a better operating experience for the users.

DETAILED DESCRIPTION OF THE EMBODIMENTS

Figure 1:
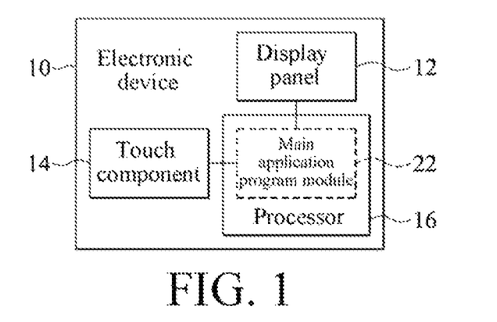
FIG. 1 is a schematic block diagram of an electronic device according to an embodiment of the disclosure.
Figure 2:
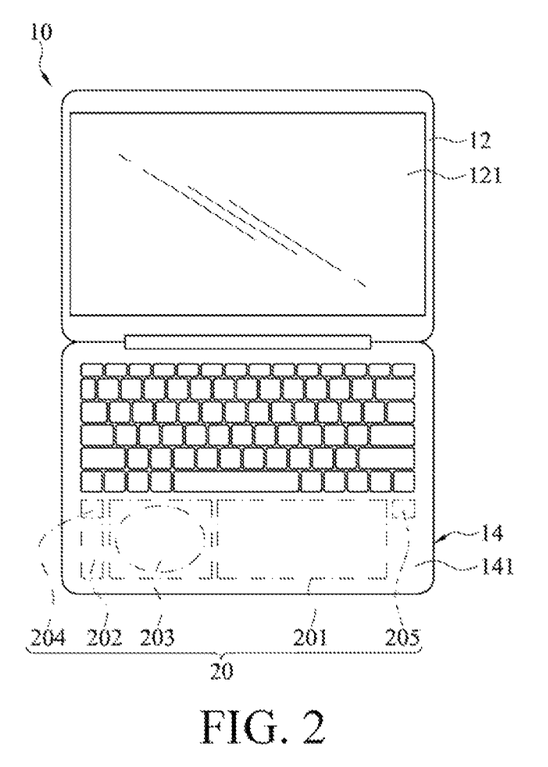
FIG. 2 is a schematic diagram of an electronic device that has been configured according to an embodiment of the disclosure.
Figure 3:
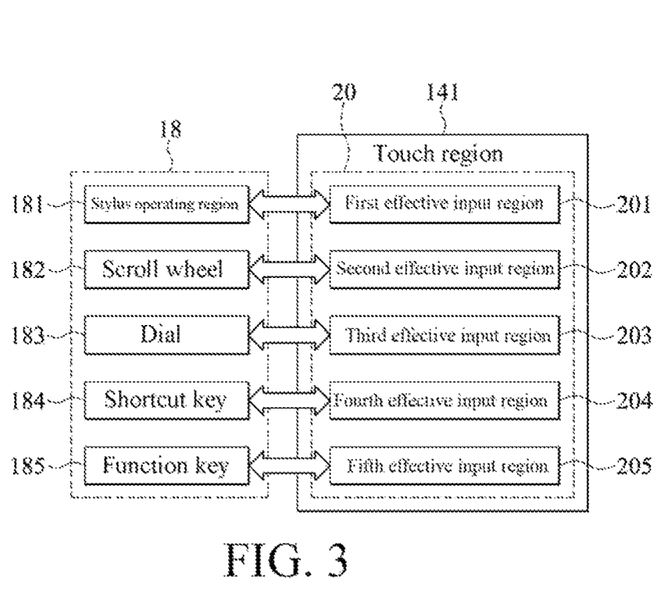
FIG. 3 is a schematic diagram of a correspondence between an input component and an effective input region according to an embodiment of the disclosure.

FIG. 1 is a schematic block diagram of an electronic device according to an embodiment of the disclosure, and FIG. 2 is a schematic diagram of an electronic device that has been configured according to an embodiment of the disclosure. Referring to FIG. 1 and FIG. 2, an electronic device 10 includes a display panel 12, a touch component 14, and a processor 16. In an embodiment, the display panel 12 includes a display region 121, the touch component 14 includes a touch region 141, and the processor 16 is electrically connected to the display panel 12 and the touch component 14. Referring to FIG. 1 to FIG. 3, the processor 16 defines at least one effective input region 20 for executing a function of at least one input component 18 in the touch region 141, and there is a one-to-one correspondence between the input component 18 and the effective input region 20, to establish link setting information between the input component 18 and the corresponding effective input region 20, and implement the function of the input component 18 according to the link setting information in response to a touch operation sensed by the effective input region 20. The link setting information includes operation position information and enabling function setting information, to enable the processor 16 to set positions and enable functions according to the operation position information and the enabling function setting information.

Referring to FIG. 1 to FIG. 3, the foregoing input component 18 is one or any combination of a stylus operating region 181, a scroll wheel 182, a dial 183, at least one shortcut key 184, or a function key 185 of at least one keyboard. In an embodiment, a plurality of input components 18 is used as an example, each of the effective input regions 20 individually corresponds to one input component 18, and positions of a plurality of effective input regions 20 in the touch region 141 do not overlap with each other.

In an embodiment, because there is a correspondence between an effective input region 201 and the stylus operating region 181, when the first effective input region 201 senses a stylus operation, the processor 16 executes a function of the stylus operating region 181 according to the corresponding link setting information in response to the stylus operation sensed by the first effective input region 201. In an embodiment, when the user performs a write operation in the first effective input region 201 by the stylus, the processor 16 executes an input function of the stylus operating region 181 according to the link setting information in response to a touch operation sensed by the first effective input region 201.

In an embodiment, because there is a correspondence between a second effective input region 202 and the scroll wheel 182, when the second effective input region 202 senses a touch operation, the processor 16 executes a function of the scroll wheel 182 according to the corresponding link setting information in response to the touch operation sensed by the first effective input region 201. In an embodiment, when the user performs a touch operation in the second effective input region 202, the processor 16 executes a scrolling function of the scroll wheel 182 according to the link setting information in response to the touch operation sensed by the second effective input region 202.

In an embodiment, because there is a correspondence between a third effective input region 203 and the dial (knob) 183, when the third effective input region 203 senses a touch operation, the processor 16 executes a function of the dial 183 according to the corresponding link setting information in response to the touch operation sensed by the third effective input region 203. In an embodiment, when the user performs a touch operation in the third effective input region 203, the processor 16 executes an input adjusting function of the dial 183 according to the link setting information in response to the touch operation sensed by the third effective input region 203.

In an embodiment, because there is a correspondence between a fourth effective input region 204 and the shortcut key 184, when the fourth effective input region 204 senses a touch operation, the processor 16 executes a function of the shortcut key 184 according to the corresponding link setting information in response to the touch operation sensed by the fourth effective input region 204. In an embodiment, when the user clicks or taps to select the fourth effective input region 204, the processor 16 executes an enabling function of an application program corresponding to the shortcut key 184 according to the link setting information in response to the touch operation sensed by the fourth effective input region 204.

In an embodiment, because there is a correspondence between a fifth effective input region 205 and the function key 185, when the fifth effective input region 205 senses a touch operation, the processor 16 executes a function of the function key 185 according to the corresponding link setting information in response to the touch operation sensed by the fifth effective input region 205. For example, the function key 185 is used for executing functions such as playing, pausing, adjusting volume, or opening a web page. When the user clicks or taps to select the fifth effective input region 205, the processor 16 executes a function corresponding to the function key 185 according to the link setting information in response to the touch operation sensed by the fifth effective input region 205.

Therefore, the first effective input region 201, the second effective input region 202, the third effective input region 203, the fourth effective input region 204, and the fifth effective input region 205 in the touch region 141 are set to execute a plurality of functions of the input component 18, to provide a diversified input mode.

In an embodiment, five effective input regions 20 are set in the touch region 141 in the embodiments shown in FIG. 2 and FIG. 3, but the disclosure is not limited thereto. One or more effective input regions 20 corresponding to one or more input components 18 are set in the touch region 141, and a quantity and types of the effective input regions 20 corresponding to the input components 18 are alternatively determined according to customized requirements of a user.

In an embodiment, the electronic device 10 is a notebook computer, and the touch component 14 is a touchpad, a touchscreen, or any input module supporting touch input, but the disclosure is not limited thereto.

Figure 4:
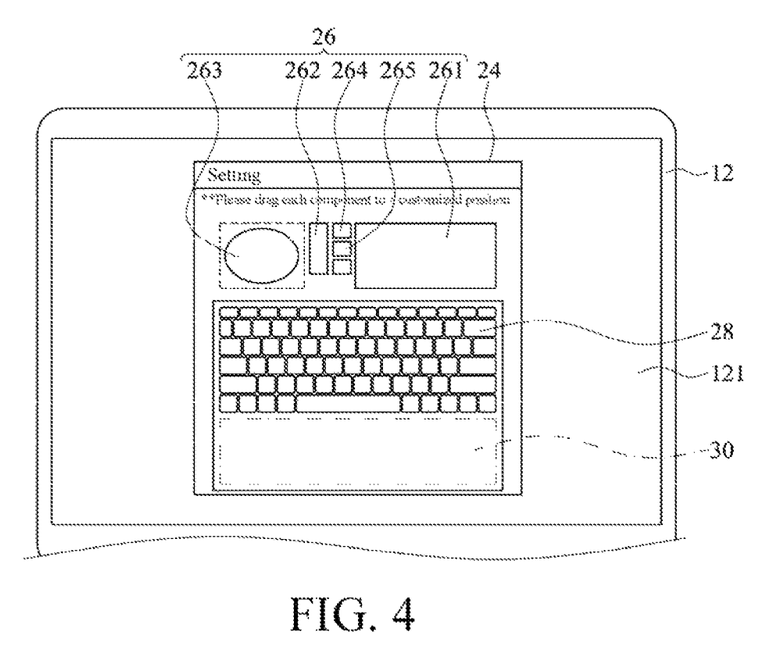
FIG. 4 is a schematic diagram of an electronic device displaying a setting interface according to an embodiment of the disclosure.

In an embodiment, the electronic device 10 of the disclosure further provides a main application program module 22 to establish link setting information between effective input regions 20 and input components 18, to allow a user to define a required input component 18 and a position of an effective input region 20 corresponding to the input component 18. Referring to FIG. 1 to FIG. 5, the main application program module 22 is first started by the processor 16, to provide a setting interface 24 displayed in the display region 121, to establish each piece of link setting information. The setting interface 24 includes a plurality of input component patterns 26 located at the top, a keyboard icon region 28 located in the middle, and a virtual touch region 30 located at the bottom. As shown in FIG. 4, each of the plurality of input component patterns 26 individually corresponds to one input component 18, to facilitate operation of a user. In an embodiment, the input component pattern 26 includes a large rectangular pattern 261 corresponding to the stylus operating region 181, an elongated pattern 262 corresponding to the scroll wheel 182, a pie pattern 263 corresponding to the dial 183, a small box pattern 264 corresponding to the shortcut key 184, a small box pattern 265 corresponding to the function key 185 of the keyboard, and the like. The virtual touch region 30 is proportionally located on the setting interface 24 in correspondence to the touch region 141. The processor 16 defines, according to a position in the virtual touch region 30 to which the input component pattern 26 is moved, the effective input region 20 corresponding to the input component 18 at a relative position in the touch region 141, where the positions of the input component patterns 26 in the virtual touch region 30 do not overlap with each other, to establish link setting information between each of the input components 18 and a corresponding effective input region 20. When the link setting information is completed, shapes and sizes of the effective input regions 20 are in proportion to shapes and sizes of the corresponding input component patterns 26.

Figure 5:
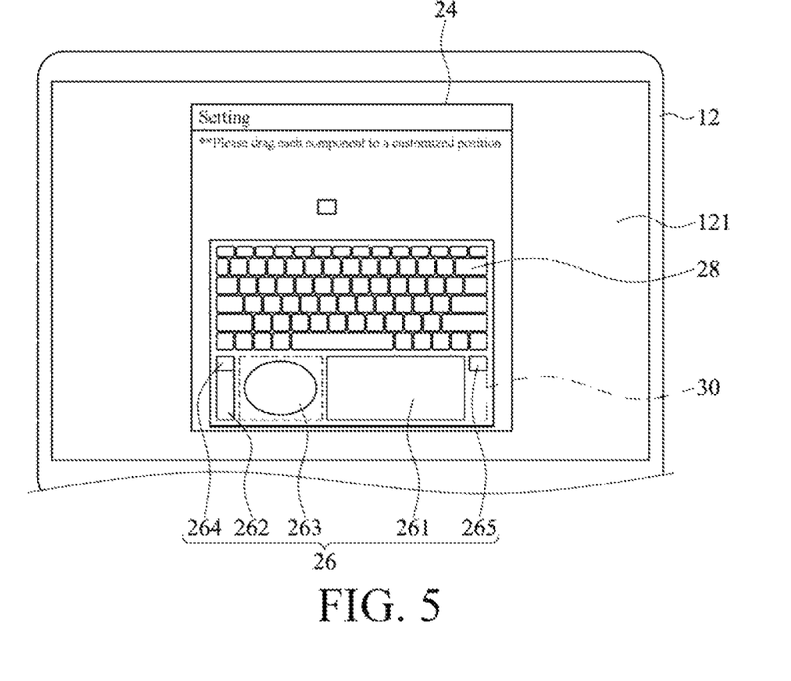
FIG. 5 is a schematic diagram of an electronic device displaying a setting status of a setting interface according to an embodiment of the disclosure.

In an embodiment, as shown in FIG. 4 and FIG. 5, the user sequentially drags the input component patterns 26 (such as the large rectangular pattern 261, the elongated pattern 262, the pie pattern 263, the small box pattern 264 corresponding to the shortcut key 184, or the small box pattern 265 corresponding to the function key 185) in the setting interface 24 to different positions in the virtual touch region 30. As shown in FIG. 2, while completing placement and setting storage, the processor 16 completes the setting of the corresponding effective input regions 20 in the touch region 141 according to all related link setting information.

Figure 6:
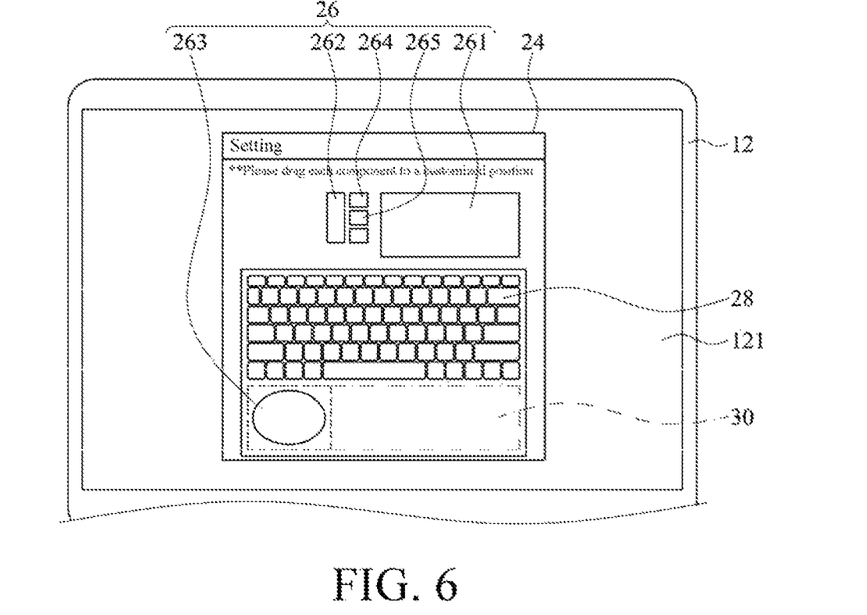
FIG. 6 is a schematic diagram of an electronic device displaying a setting status of a setting interface according to another embodiment of the disclosure.
Figure 7:
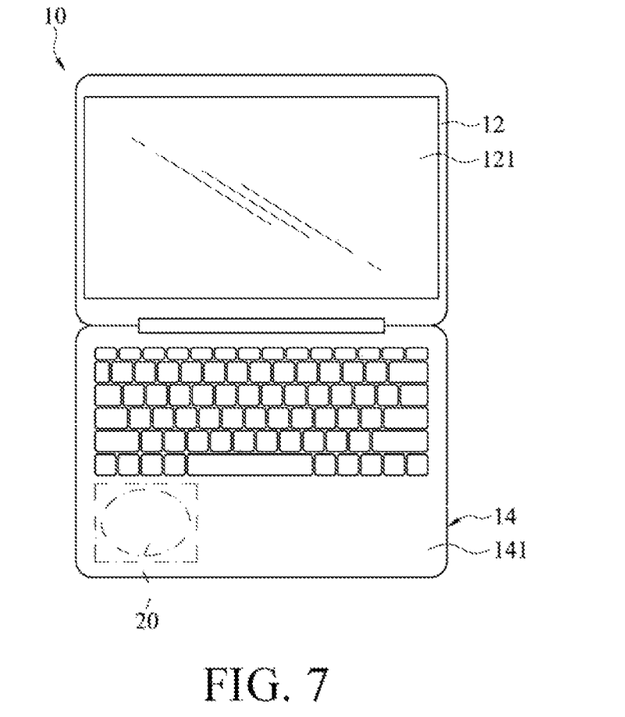
FIG. 7 is a schematic diagram of an electronic device that has been configured according to another embodiment of the disclosure.

In another embodiment, as shown in FIG. 4 and FIG. 6, the user only drags one input component pattern 26 in the setting interface 24 to a specific position in the virtual touch region 30, that is, the pie pattern 263 located on a left side of the virtual touch region 30. As shown in FIG. 7, after completing configuration and setting storage, the processor 16 completes the setting of the corresponding effective input region 20 in the touch region 141 according to the related link setting information. In this case, there is only one effective input region 20 corresponding to the dial 183 in the touch region 141. Therefore, during the setting, one or more input component patterns 26 are dynamically placed in the virtual touch region 30 according to requirements of the user, thereby correspondingly configuring a same quantity of effective input regions 20 at the same positions in the touch region 141.

Because an operating system (OS) of the processor 16 performs both the setting by the setting interface 24 and the operation on the touch component 14, a setting mode and an execution mode of the main application program module 22 are alternatively illustrated by using an architecture of the operating system of the processor 16. Referring to FIG. 1 to FIG. 8, the main application program module 22, a touchpad driving module 32, a stylus driving module 34, a scroll wheel (mouse) driving module 36, a dial driving module 38, an application program module 40, or a user function driving module 42 is run on the operating system of the processor 16, and the touchpad driving module 32 is in a signal connection to the main application program module 22, the stylus driving module 34, the scroll wheel driving module 36, the dial driving module 38, the application program module 40, and the user function driving module 42. A setting interface 24 is provided by the main application program module 22 to set the effective input region 20 corresponding to the input component 18 in the touch region 141, to establish the link setting information between the input component 18 and the corresponding effective input region 20. The touchpad driving module 32 corresponds to the touch component 14, to sense all operations in the touch region 141, the stylus driving module 34 corresponds to the stylus operating region 181, the scroll wheel driving module 36 corresponds to the scroll wheel 182, the dial driving module 38 corresponds to the dial 183, the application program module 40 corresponds to the shortcut key 184, and the user function driving module 42 corresponds to the function key 185 of the keyboard. When the user completes the setting by the setting interface 24, the main application program module 22 communicates with the touchpad driving module 32, to provide all pieces of link setting information to the touchpad driving module 32 to set positions and enable functions. The link setting information is stored in a storage unit 44 of the operating system of the processor 16 for the main application program module 22 or the touchpad driving module 32 to access. When the user performs an operation on the touch component 14, the touchpad driving module 32 obtains a corresponding effective input region 20 and link setting information according to an operation position, to enable the touchpad driving module 32 to communicate with the stylus driving module 34, the scroll wheel driving module 36, the dial driving module 38, the application program module 40, or the user function driving module 42 according to different link setting information, further causing the stylus driving module 34, the scroll wheel driving module 36, the dial driving module 38, the application program module 40, or the user function driving module 42 to execute a corresponding function.

Figure 8:
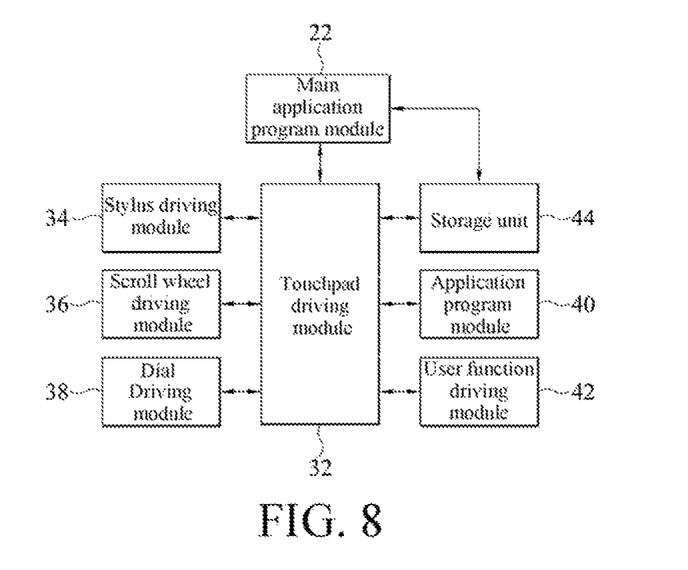
FIG. 8 is a schematic architectural diagram of an operating system of an electronic device according to an embodiment of the disclosure.

In an embodiment, there are two manners for the touchpad driving module 32 to obtain link setting information, one is that the touchpad driving module 32 directly reads corresponding link setting information from the storage unit 44, and the other is that the touchpad driving module 32 reads link setting information in the storage unit 44 by using the main application program module 22, and then transmits the link setting information to the touchpad driving module 32 by using the main application program module 22 for processing.

Referring to FIG. 1 to FIG. 8, the second effective input region 202 is used as an example. When a user slides upward or downward at a position of the second effective input region 202 in the touch region 141, the touchpad driving module 32 receives a touch operation gesture in the second effective input region 202, finds corresponding link setting information according to the position of the second effective input region 202, and further, obtains an input component 18 corresponding to the scroll wheel 182 by the link setting information. Therefore, the touchpad driving module 32 communicates with the scroll wheel driving module 36, to cause the scroll wheel driving module 36 to execute a corresponding scrolling function according to the touch operation gesture, and finally, a scrolling effect is seen. In addition, the fourth effective input region 204 is used as an example. When a user directly presses a position of the fourth effective input region 204 in the touch region 141, the touchpad driving module 32 is informed that the fourth effective input region 204 is touched and pressed, finds corresponding link setting information according to the position of the fourth effective input region 204, and further obtains an input component 18 corresponding to the shortcut key 184 by the link setting information. Therefore, the touchpad driving module 32 communicates with the application program module 40, to directly start the application program module 40. By analogy, when an operation is performed in the touch region 141 on the touch component 14, the touchpad driving module 32 finds an input component 18 in the effective input region 20 corresponding to a position of the user operation, and drives a corresponding driving module to implement a related function according to the link setting information. Therefore, the user directly controls the functions corresponding to all the input components 18 that have been configured on the touch component 14, which is convenient.

In conclusion, in the disclosure, according to requirements of users, an operation position of the input component corresponding to the touch component is set dynamically, to provide user-defined multi-mode touch operation interfaces, thereby further providing a better operating experience for the users.

The foregoing embodiments are merely for describing the technical ideas and the characteristics of the disclosure, and are intended to enable those skilled in the art to understand and hereby implement the content of the disclosure. However, the scope of claims of the disclosure is not limited thereto. In other words, equivalent changes or modifications made according to the spirit disclosed in the disclosure shall still fall within the scope of the claims of the disclosure.

What is claimed is:

1. An electronic device, comprising:
   a display panel, comprising a display region;
   a touch component, comprising a touch region; and
   a processor, electrically connected to the display panel and the touch component, wherein the processor defines at least one effective input region for executing a function of at least one input component in the touch region, to establish link setting information between the input component and the corresponding effective input region, and execute the function of the input component according to the link setting information in response to a touch operation transmitted by the effective input region;
   wherein the processor further provides a setting interface displayed in the display region, for establishing the link setting information; and
   wherein the setting interface comprises: a plurality of input component patterns, wherein each of the input component patterns individually corresponds to one of the input components; and a virtual touch region, corresponding to the touch region, wherein the processor defines, the effective input region corresponding to the input component at a relative position in the touch region according to a position in the virtual touch region to which the input component pattern is moved, to establish the link setting information between the input component and the effective input region.

2. The electronic device according to claim 1, wherein the input component is a stylus operating region, a scroll wheel, a dial, at least one shortcut key, or a function key of at least one keyboard.

3. The electronic device according to claim 1, wherein the input component comprises a stylus operating region, a scroll wheel, a dial, at least one shortcut key, and a function key of at least one keyboard, to cause the input component patterns to each correspond to one of the input components.

4. The electronic device according to claim 3, wherein shapes and sizes of the effective input regions are in proportion to shapes and sizes of the corresponding input component patterns.

5. The electronic device according to claim 1, wherein the virtual touch region comprises one or more of the input component patterns.

6. The electronic device according to claim 5, wherein positions of the plurality of input component patterns in the virtual touch region do not overlap with each other.

7. The electronic device according to claim 1, wherein the virtual touch region is proportionally located on the setting interface in correspondence to the touch region.

8. The electronic device according to claim 1, wherein the setting interface further comprises a keyboard icon region, located between the input component patterns and the virtual touch region.

9. The electronic device according to claim 1, wherein the link setting information comprises operation position information and enabling function setting information.

10. The electronic device according to claim 1, wherein the processor further comprises a storage unit, configured to store the link setting information.

\* \* \* \* \*